US008467115B2

(12) United States Patent
Kozushi

(10) Patent No.: US 8,467,115 B2
(45) Date of Patent: Jun. 18, 2013

(54) IMAGE FORMATION APPARATUS

(75) Inventor: Takehiro Kozushi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 321 days.

(21) Appl. No.: 12/901,141

(22) Filed: Oct. 8, 2010

(65) Prior Publication Data

US 2011/0228360 A1 Sep. 22, 2011

(30) Foreign Application Priority Data

Mar. 19, 2010 (JP) ................................ 2010-064219

(51) Int. Cl.
*H04N 1/04* (2006.01)

(52) U.S. Cl.
USPC ............ 358/505; 358/474; 358/498; 358/497

(58) Field of Classification Search
USPC .......................... 358/505, 474, 498, 497, 496
See application file for complete search history.

(56) References Cited

U.S. PATENT DOCUMENTS 7,416,178 B2 * 8/2008 Ito ................................ 271/3.14
2005/0281597 A1 12/2005 Ito
2005/0281598 A1 12/2005 Hattori et al.

FOREIGN PATENT DOCUMENTS

JP 11-165934 A 6/1999
JP 2002-023437 A 1/2002
JP 2005-062578 A 3/2005
JP 2006-1141 A 1/2006
JP 2006-3649 A 1/2006

* cited by examiner

*Primary Examiner* — Houshang Safaipour
(74) *Attorney, Agent, or Firm* — Sughrue Mion, PLLC

(57) ABSTRACT

An image formation apparatus includes an image formation unit, an image reading unit, and a guide portion. The image formation unit discharges a recording medium on which an image is formed by an image forming portion into a recording medium discharge space by applying conveying force to the recording medium and bends the recording medium in a given shape preventing a leading end portion of the recording medium from free fall. The image reading unit reads a document image and is disposed above the image formation unit so that the recording medium discharge space is disposed between the image reading unit and the image formation unit. The guide portion has a protrusion portion protruding toward the recording medium discharge space from a lower face of the image reading unit and that lead the leading end portion to free fall by reducing the bending of the leading end portion.

10 Claims, 16 Drawing Sheets

IMAGE FORMATION APPARATUS

CROSS-REFERENCE TO RELATED APPLICATIONS

This application is based upon and claims priority under 35 USC 119 from Japanese Patent Application No. 2010-064219, filed Mar. 19, 2010.

BACKGROUND

1. Technical Field

The present invention relates to an image formation apparatus.

2. Summary of the Invention

According to an aspect of the invention, an image formation apparatus includes an image formation unit, an image reading unit, and a guide portion. The image formation unit discharges a recording medium on which an image is formed by an image forming portion into a recording medium discharge space by applying conveying force to the recording medium and bends the recording medium in a given shape preventing a leading end portion of the recording medium from free fall. The image reading unit reads a document image and is disposed above the image formation unit so that the recording medium discharge space is disposed between the image reading unit and the image formation unit. The guide portion has a protrusion portion protruding toward the recording medium discharge space from a lower face of the image reading unit and that lead the leading end portion to free fall by reducing the bending of the leading end portion when the leading end portion goes into the protrusion portion in a state where the discharging force is applied to the recording medium.

BRIEF DESCRIPTION OF THE DRAWINGS

Exemplary embodiments of the invention will be described in detail based on the following figures, wherein.

DETAILED DESCRIPTION

A description will be given hereinbelow of an exemplary embodiment of the present invention with reference to the drawings.

Exemplary Embodiment 1

Figure 2:
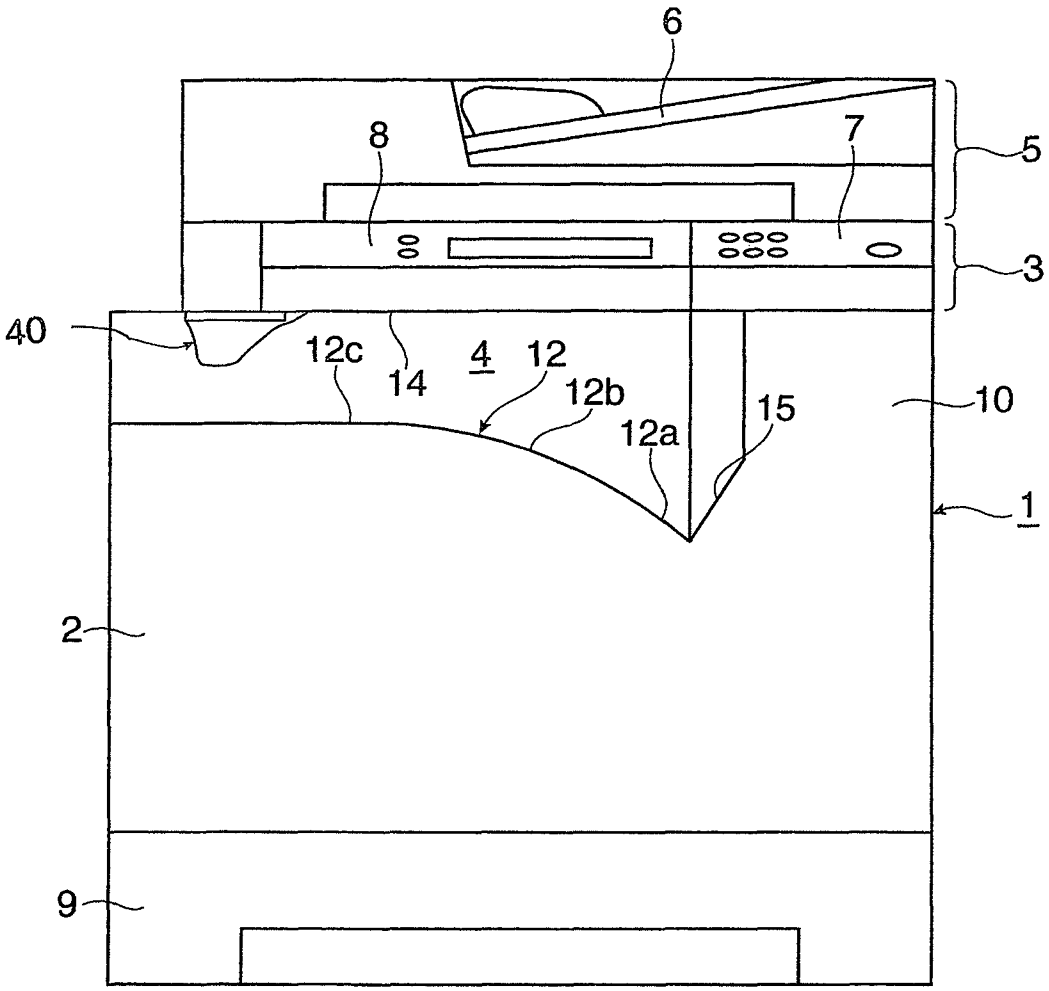
FIG. 2 is a structural view showing the tandem-type color image formation apparatus as the image formation apparatus according to Exemplary Embodiment 1 of the present invention.

FIG. 2 shows a tandem-type color image formation apparatus as an image formation apparatus according to Exemplary Embodiment 1 of the present invention. The tandem-type color image formation apparatus includes an image reading apparatus as an image reading unit, and has functions of copying an image read by the image reading apparatus, sending an image to a personal computer, a server, a cellular phone, and the like, and a function as a facsimile that performs transmission/reception of image information via a telephone line in addition to a function of forming an image on the basis of image information sent from a personal computer (not shown) and the like.

In FIG. 2, the reference numeral 1 denotes a tandem-type color image formation apparatus, and the color image formation apparatus 1 includes an image formation apparatus main body 2 having an image formation section as an image formation unit therein. The image formation section includes a plurality of photosensitive drums, an intermediate transfer belt, and the like though they are not shown. After primarily transferring toner images of colors of yellow, magenta, cyan, and black that are successively formed on the plurality of photosensitive drums, the image formation section secondarily transfers the toner images onto a recording medium as a recording medium, and further fixes the individual tone images of colors of yellow, magenta, cyan, and black transferred onto the recording medium to form a full-color or monochrome image. Note that the image formation section described above is not particularly limited as long as it is capable of forming the image on the recording medium as the recording medium, and the image formation section may also be the one that has only one photosensitive drum and is capable of forming the full-color image, or the one that has only one photosensitive drum and forms the monochrome image. In addition, an image formation method of the image formation section is not limited to an electrophotographic method, and the image formation section may also be the one in which an inkjet method is adopted.

Above the image formation apparatus main body 2 described above, there is disposed an image reading apparatus 3 as the image reading unit for reading a document image via discharge space 4 for discharging the recording medium as the recording medium.

As shown in FIG. 2, the above-described image reading apparatus 3 includes an automatic document transport apparatus 5 that also has a function as a document pressing member for pressing the document, and transports documents (not shown) accommodated on a document accommodation tray 6 of the automatic document transport apparatus 5 one by one onto a platen glass (not shown) of the image reading apparatus 3, and reads the document image. In addition, on the front surface side of the above-described image reading apparatus 3, an operation panel 7 and a display panel 8 for operating the color image formation apparatus 1 are attached. Note that the above-described color image formation apparatus 1 may also be the one that includes a document pressing member formed of a normal platen glass instead of the automatic document transport apparatus 5.

Additionally, the above-described image reading apparatus 3 is basically capable of reading a document image of, e.g., an A4 size (210×297 mm) at the maximum, but is actually capable of reading a document of a legal size (8.5×14 inches=about 216×about 356 mm) that is slightly larger than the recording medium of the A4 size. In the image reading apparatus 3, a document is placed on the platen glass, and the image of the document placed on the platen glass is read while being illuminated by a light source. In addition, the above-described image reading apparatus 3 reads the image of the document transported by the automatic document transport apparatus 5, while illuminating the image of the document using the light source. The platen glass described above is formed to be larger than the document of the readable maximum size to some extent. Under the platen glass, there are disposed the light source that illuminates the document, a mirror that guides a reflected light image from the document to an image reading element and an image forming lens, and a drive system that drives the light source, the mirror, and the like. The image reading apparatus 3 has a plane configuration slightly larger than the document of the readable maximum size.

Further, under the above-described image formation apparatus main body 2, there is provided a sheet feed apparatus 9 that feeds recording mediums as the recording medium of a desired size and material in the state where the recording mediums are separated from each other. The sheet feed apparatus 9 is also capable of feeding, as the recording medium mentioned above, the recording medium of the legal size slightly larger than the recording medium of the A4 size. In the state where the recording mediums of the desired size and material are accommodated in a sheet feed cassette (not shown), the above-described sheet feed apparatus 9 feeds the recording mediums that are separated from each other from the left side to the right side in FIG. 2 from the sheet feed cassette, and then transports the recording mediums from the lower side to the upper side in a vertical direction. Subsequently, in the image formation section described above, a full-color or monochrome image is formed on the recording medium using the plurality of photosensitive drums, the intermediate transfer belt, and the like that are provided inside the image formation apparatus main body 2. As shown in FIG. 2, the recording medium formed with the full-color or monochrome image by the image formation section described above is discharged with the surface formed with the image faced downward from a discharge roll 11 as a discharge means positioned in the middle of a sheet discharge section 10 provided on the right side end portion of the image formation apparatus main body 2 in upwardly projecting relation onto a sheet discharge tray 12 provided on the upper surface of the image formation apparatus main body 2 via the discharge space 4.

Note that, as shown in FIG. 2, in the above-described color image formation apparatus 1, one (forward side when the drawing is viewed in three dimensions) of directions (directions vertical to the drawing of FIG. 2) intersecting a feed direction of the recording medium (left-to-right direction in FIG. 2) serves as a front surface side, while the other direction (backward side) serves as a back surface side and, as described above, the operation panel 7 and the display panel 8 for operating the color image formation apparatus 1 are provided on the front surface side of the image reading apparatus 3. In addition, the supply of the recording medium to the sheet feed cassette (not shown) of the above-described sheet feed apparatus 9 and the replacement of the sheet feed cassette are performed by pulling out the sheet feed cassette toward the front surface side of the color image formation apparatus 1.

In the above-described color image formation apparatus 1, according to which surface serves as the front surface side or the back surface side, the operability of the color image formation apparatus 1 when used on a desk in an office is determined. As described above, in the color image formation apparatus 1, one (forward side when the drawing is viewed in three dimensions) of directions (directions vertical to the drawing of FIG. 2) intersecting the feed direction of the recording medium (left-to-right direction in FIG. 2) serves as the front surface side, while the other direction (backward side) serves as the back surface side, whereby it is possible to perform the work such as the supply of the recording medium to the sheet feed cassette of the sheet feed apparatus 9, the removal of the sheet feed cassette from the sheet discharge tray 12, or the replacement of a toner cartridge on the front surface side of the color image formation apparatus 1, and a reduction in size and space of the apparatus is achieved while the operability is maintained.

As shown in FIG. 2, in the sheet discharge tray 12, an end portion 12*a* on the upstream side along the discharge direction of the recording medium is formed at the lowest position, an end portion on the downstream side in the discharge direction of the recording medium corresponds to a flat portion 12*c* that is flatly formed with a curved portion 12*b* formed into an upwardly curved configuration along the downstream side in the discharge direction of the recording medium interposed between the end portion 12*a* and the flat portion 12*c*.

A recording medium 13 to be discharged onto the above-described sheet discharge tray 12 is discharged onto the sheet discharge tray 12 after its end portion on the downstream side in the discharge direction is brought into contact with an under surface 14 of the image reading apparatus 3 or passes through the position near the under surface 14 of the image reading apparatus 2, moves along the curved portion 12*b* by its own weight when it drops onto the sheet discharge tray 12, and is aligned by the contact of an end portion thereof on the upstream side in the discharge direction of the recording medium 13 with an upwardly projected side surface 15 of the sheet discharge section 10.

Figure 3:
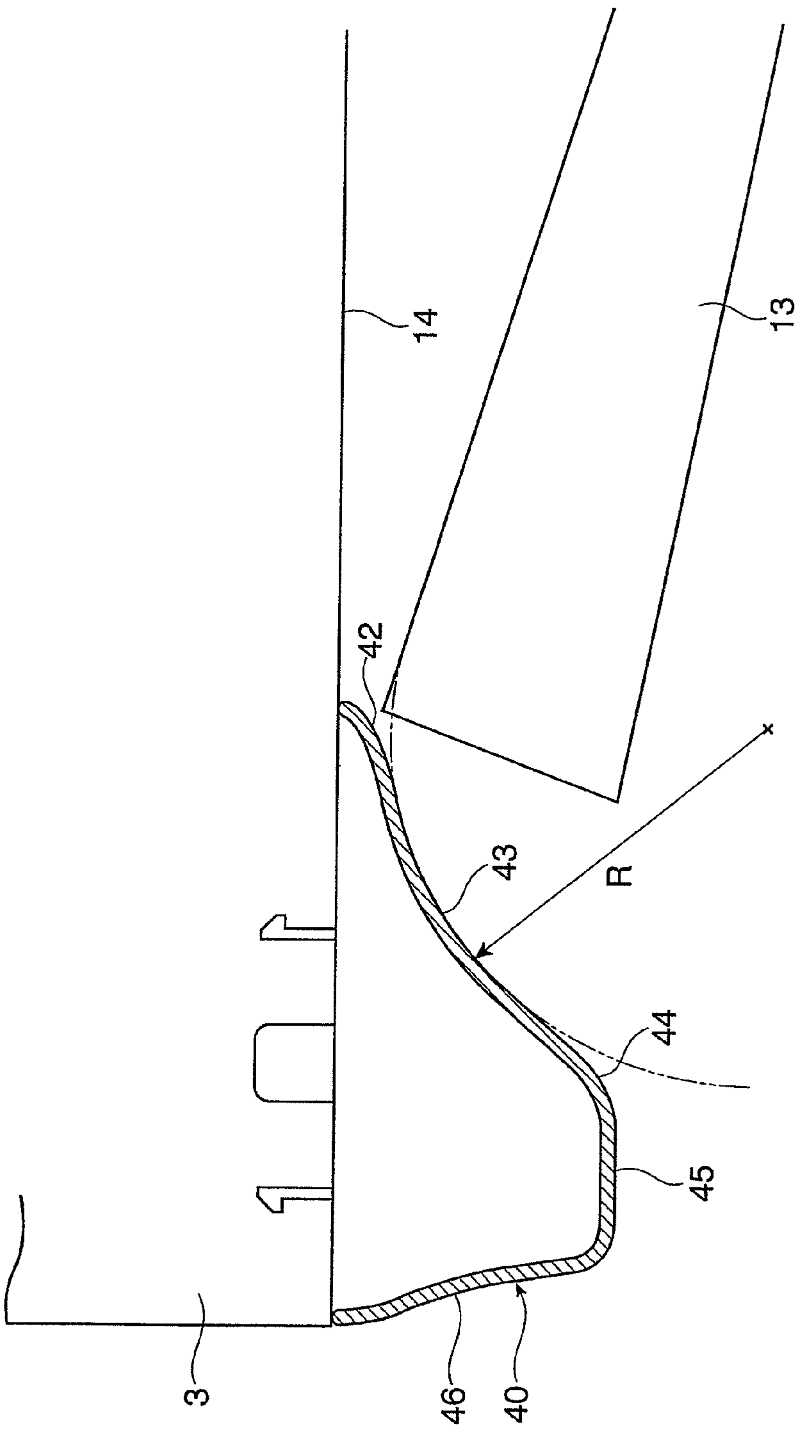
FIG. 3 is a perspective structural view showing a main body frame of the tandem-type color image formation apparatus as the image formation apparatus according to Exemplary Embodiment 1 of the present invention.
Figure 4:
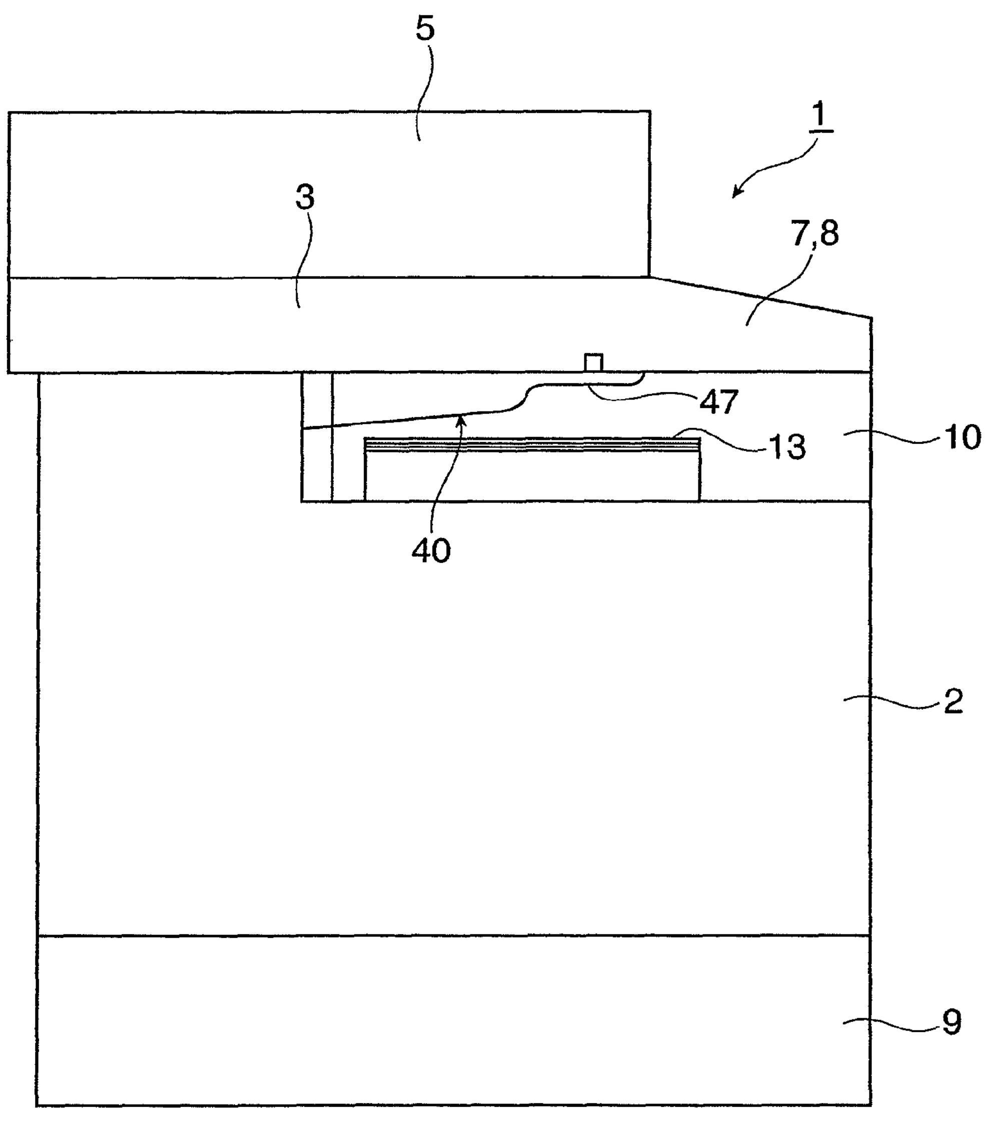
FIG. 4 is a perspective structural view showing a part of the main body frame of the tandem-type color image formation apparatus as the image formation apparatus according to Exemplary Embodiment 1 of the present invention.

As shown in FIG. 3, the above-described image formation apparatus main body 2 includes a main body frame 16 that is formed into a rectangular parallelepiped configuration that has an upper surface and a part of a front surface opened by sheet-metal working or the like, and there is disposed a fixing frame 17 for performing fixing with the right-side end portion of the image reading apparatus 3 placed thereon on the upper end portion of the main body frame 16 on the right side in FIG. 3 in spanning relation between the back surface side and the front surface side of the main body frame 16. Herein, as shown in FIG. 2, the image reading apparatus 3 described above is disposed such that the right-side end portion as one end portion thereof matches the right-side end portion as one end portion of the image formation apparatus main body 2. In addition, as shown in FIG. 3, near the left-side end portion of the main body frame 16 described above, there is provided a support frame 18 as a support member for supporting the image reading apparatus 3 with the left-side end portion of the image reading apparatus 3 placed thereon. The support frame 18 has a base end portion fixed to the back surface side of the main body frame 16, and is provided such that the tip end portion thereof protrudes from the back surface side to the front surface side in a cantilever-like configuration. Further, as shown in FIG. 4, on the back surface of the side provided with the support frame 18 of the above-described main body frame 16, there is obliquely disposed a reinforcement frame 19 for increasing the rigidity of the main body frame 16 when the weight of the image reading apparatus 3 acts on the support frame 18.

Figure 5:
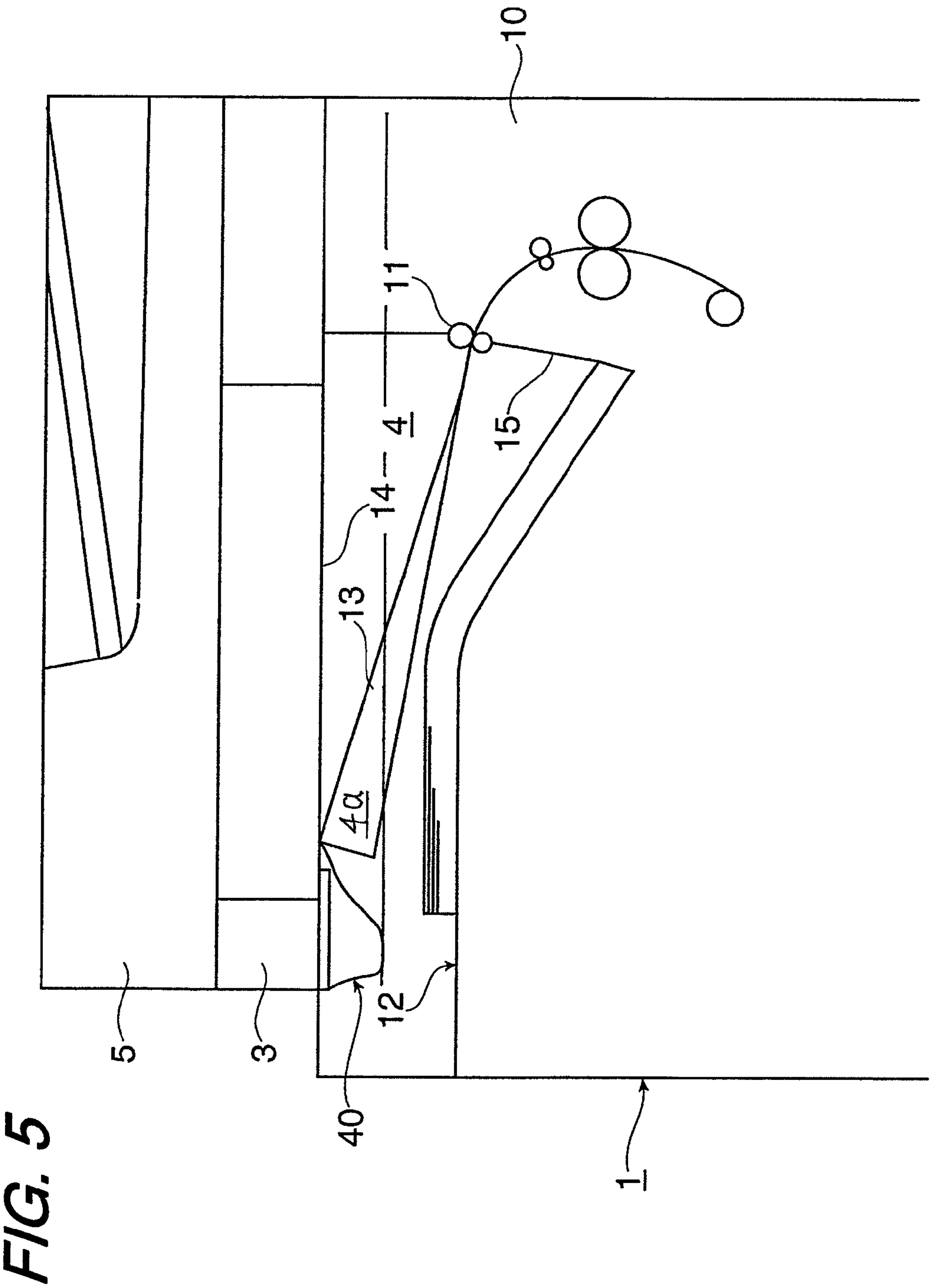
FIG. 5 is a perspective view showing a support frame.
Figure 6:
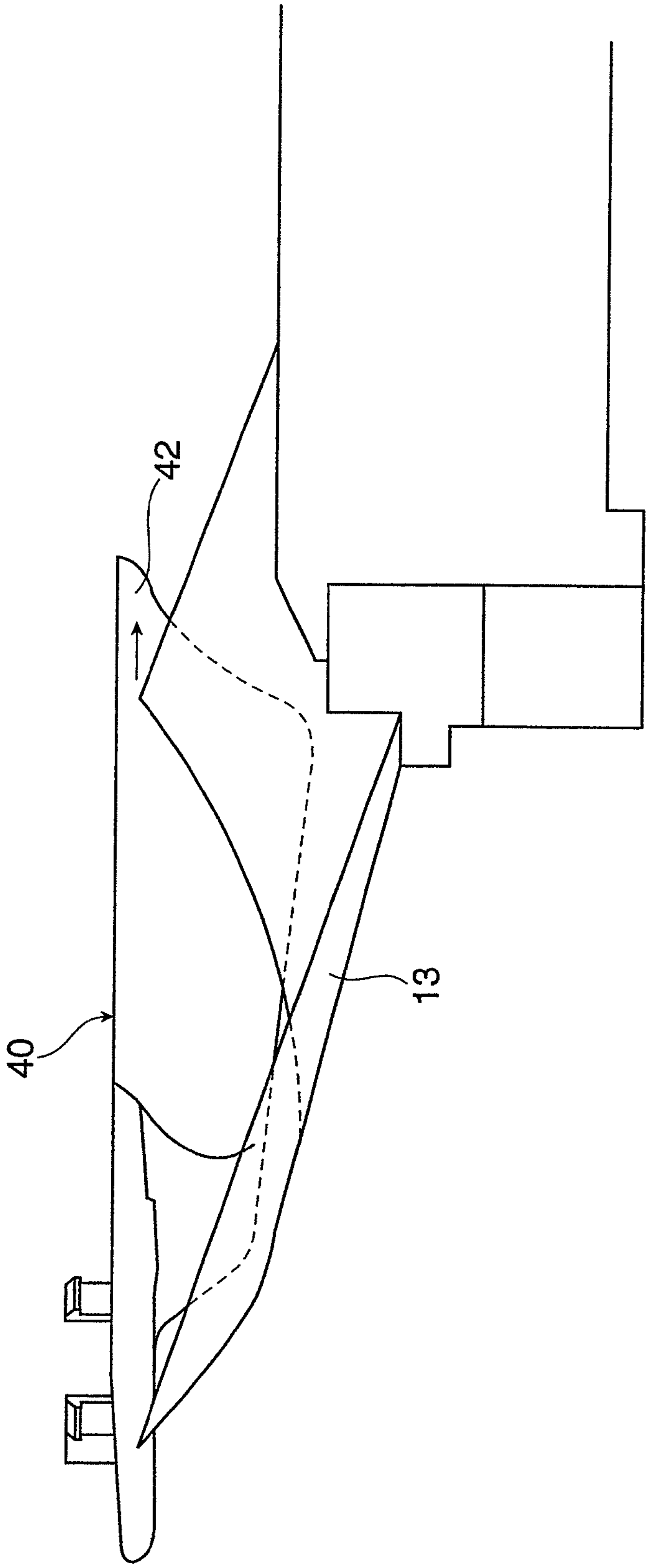
FIG. 6 is a perspective view showing the support frame.
Figure 7:
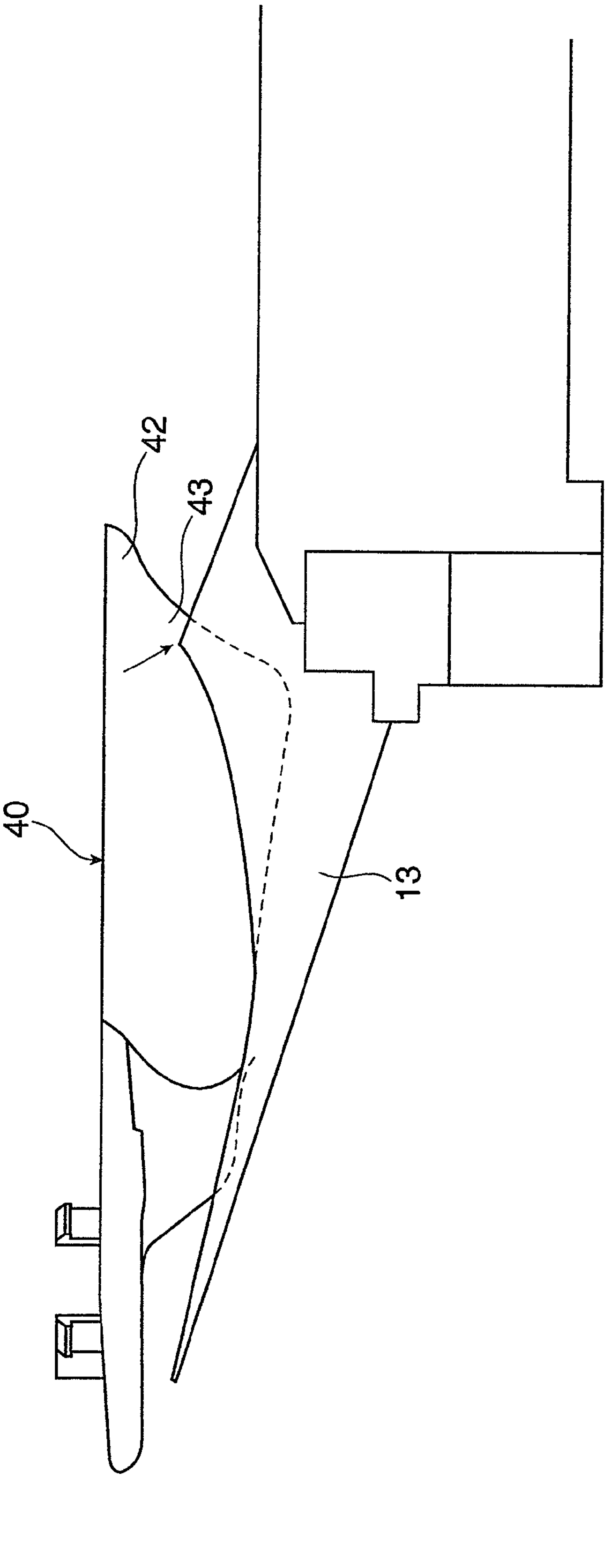
FIG. 7 is an elevational view showing the support frame.

In the present exemplary embodiment, as shown in FIGS. 5 to 7, the above-described support frame 18 is formed into a predetermined configuration by, e.g., bending one sheet metal by press working. The support frame 18 is broadly comprised of an attachment portion 20 for attaching the support frame 18 to the main body frame 16 of the image formation apparatus main body 2, and a support portion 21 for supporting the image reading apparatus 3.

In the present exemplary embodiment, in order to reduce the size of the entire color image formation apparatus 1, the height of the discharge space 4 positioned between the image formation apparatus main body 2 and the image reading apparatus 3 is set to be low, and the space defined by the under surface of the image reading apparatus 3 and the lower end portion of the support frame 18 is utilized for discharging the recording medium.

As shown in FIGS. 5 and 6, the attachment portion 20 of the above-described support frame 18 is provided on one end portion (base end portion) in a longitudinal direction of the support frame 18 and, as shown in FIG. 7, the attachment portion 20 includes first and second attachment plate portions 22 and 23 that are formed into the state where they are bent so as to protrude on both sides of a direction intersecting the longitudinal direction of the support frame 18, a third attachment plate portion 24 that is bent so as to protrude by a length shorter than that of the first attachment plate portion 22 at a position higher than that of the first attachment plate portion 22, and fourth and fifth attachment plate portions 25 and 26 that are provided on one end surface (base end surface) in the longitudinal direction of the support frame 18, as shown in FIG. 5.

Figure 8:
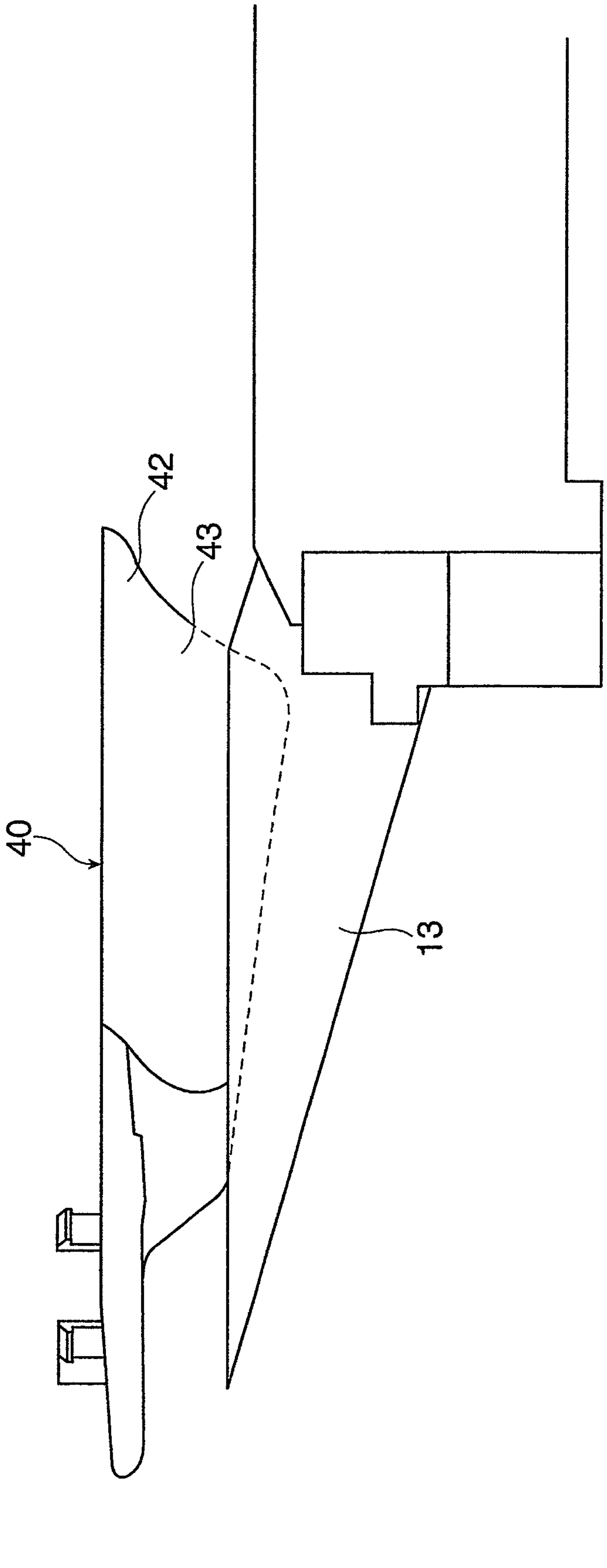
FIG. 8 is a perspective structural view showing a state where the support frame is attached to the main body frame of the color image formation apparatus.

As shown in FIG. 8, the above-described support frame 18 is fixed to the main body frame 16 positioned on the back surface side of the image formation apparatus main body 2 via the first to fifth attachment plate portions 22 to 26 by means of screws (not shown) and the like. Note that a fixing piece 27 for fixing a cover member described later is provided on the tip end surface of the above-described support frame 18, as shown in FIGS. 6 and 8.

In addition, as shown in FIGS. 5 and 6, the support portion 21 of the above-described support frame 18 is formed into a rectangular configuration with its slender plane configuration along the longitudinal direction of the support frame 18. An upper end surface 30 of the support portion 21 is formed into a slender rectangular configuration, and there are provided a reinforcement protruded portion 31 that has a plane configuration formed into an oval configuration so as to upwardly protrude by a predetermined height on the upper end surface 30, and contact protruded portions 32 and 32 each of which has a plane configuration formed into an oblong configuration so as to upwardly protrude by a predetermined height on both end portions in the longitudinal direction of the reinforcement protruded portion 31.

Further, in the support portion 21 of the above-described support frame 18, both end portions 33 and 34 in a direction intersecting the longitudinal direction of the upper end surface 30 are downwardly bent so as to have different lengths of their downwardly bent portions and, as shown in FIG. 6, lower end edges 35 and 36 of the bent portions 33 and 34 are further bent inwardly in an L configuration so as to oppose each other from the tip end of the support frame 18 to the attachment portion 20 thereof. As a result, in the support portion 21 of the above-described support frame 18, the cross-sectional configurations of the both end portions 33 and 34 in the direction intersecting the longitudinal direction are formed into U configurations having different widths, and the rigidity of the support portion 21 in the longitudinal direction is thereby enhanced.

Furthermore, as shown in FIGS. 5 and 6, the support portion 21 of the above-described support frame 18 is set such that lengths L1 and L2 of the bent portions 33 and 34 positioned on the both end portions in the direction intersecting the longitudinal direction are different from each other. Among the bent portions 33 and 34 described above, in the bent portion 33 positioned on the upstream side in the discharge direction of the recording medium, the length L1 is relatively short, and is set to be constant along the longitudinal direction of the support frame 18, while in the bent portion 34 positioned on the downstream side in the discharge direction of the recording medium, the length L2 is relatively long, and is set to become gradually longer along the longitudinal direction of the support frame 18. As a result, the support portion 21 of the above-described support frame 18 is formed to be laterally asymmetrical along the direction intersecting the longitudinal direction.

Figure 9:
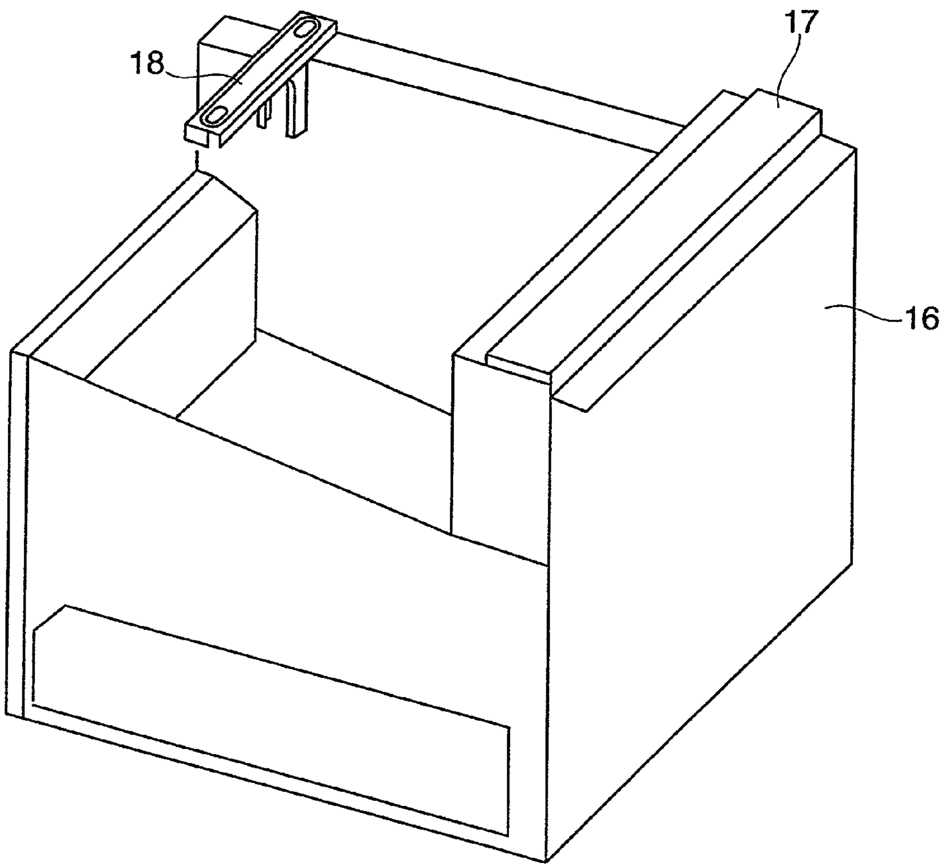
FIG. 9 is a plan structural view showing the principal portion of the tandem-type color image formation apparatus as the image formation apparatus according to Exemplary Embodiment 1 of the present invention.

Moreover, as shown in FIG. 9, the length of the above-described support frame 18 is set such that the tip end portion thereof reaches a generally central portion of the recording medium 13 to be discharged onto the sheet discharge tray 12 in a direction intersecting the discharge direction of the recording medium 13.

Figure 1:
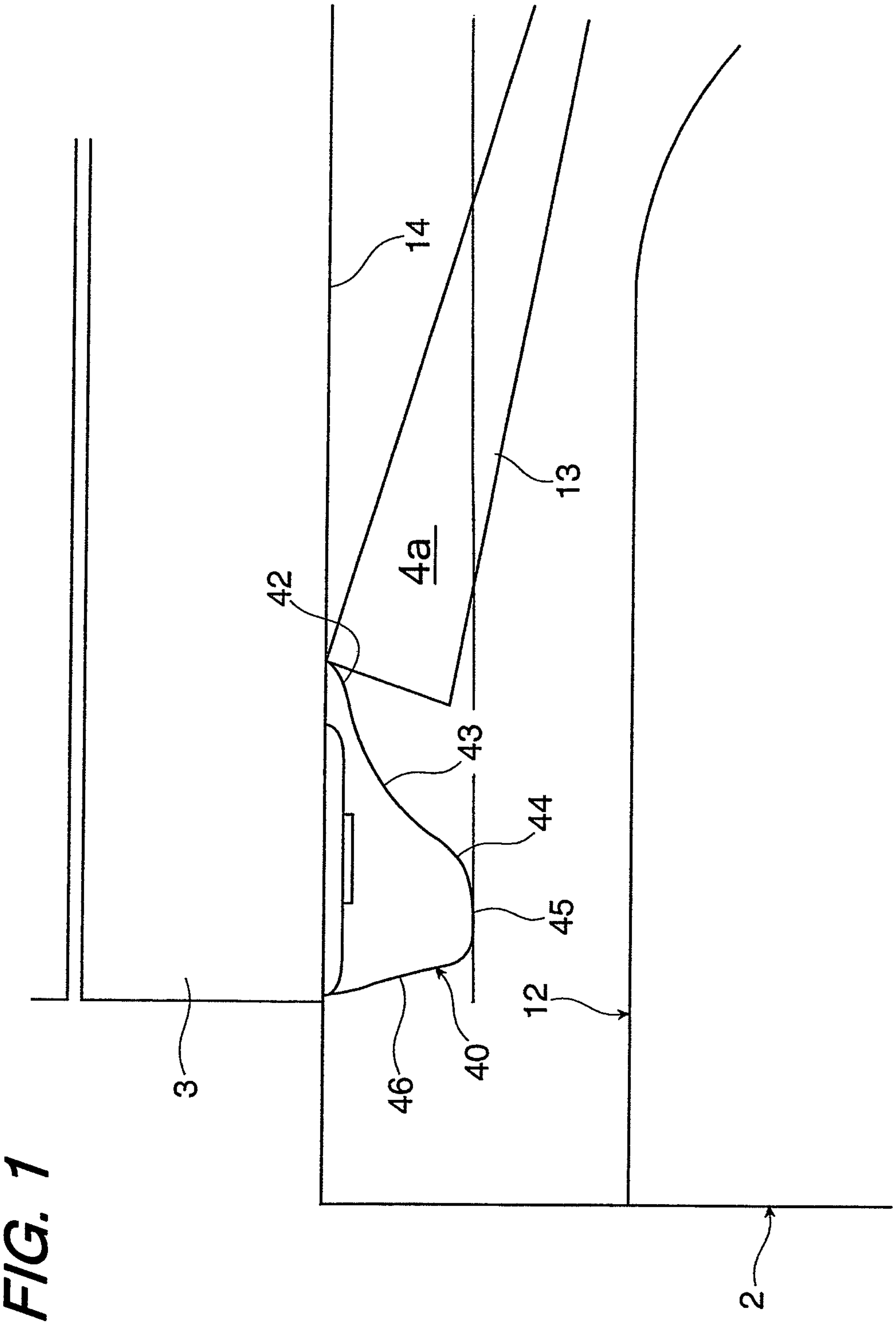
FIG. 1 is a structural view showing a principal portion of a tandem-type color image formation apparatus as an image formation apparatus according to Exemplary Embodiment 1 of the present invention.
Figure 10:
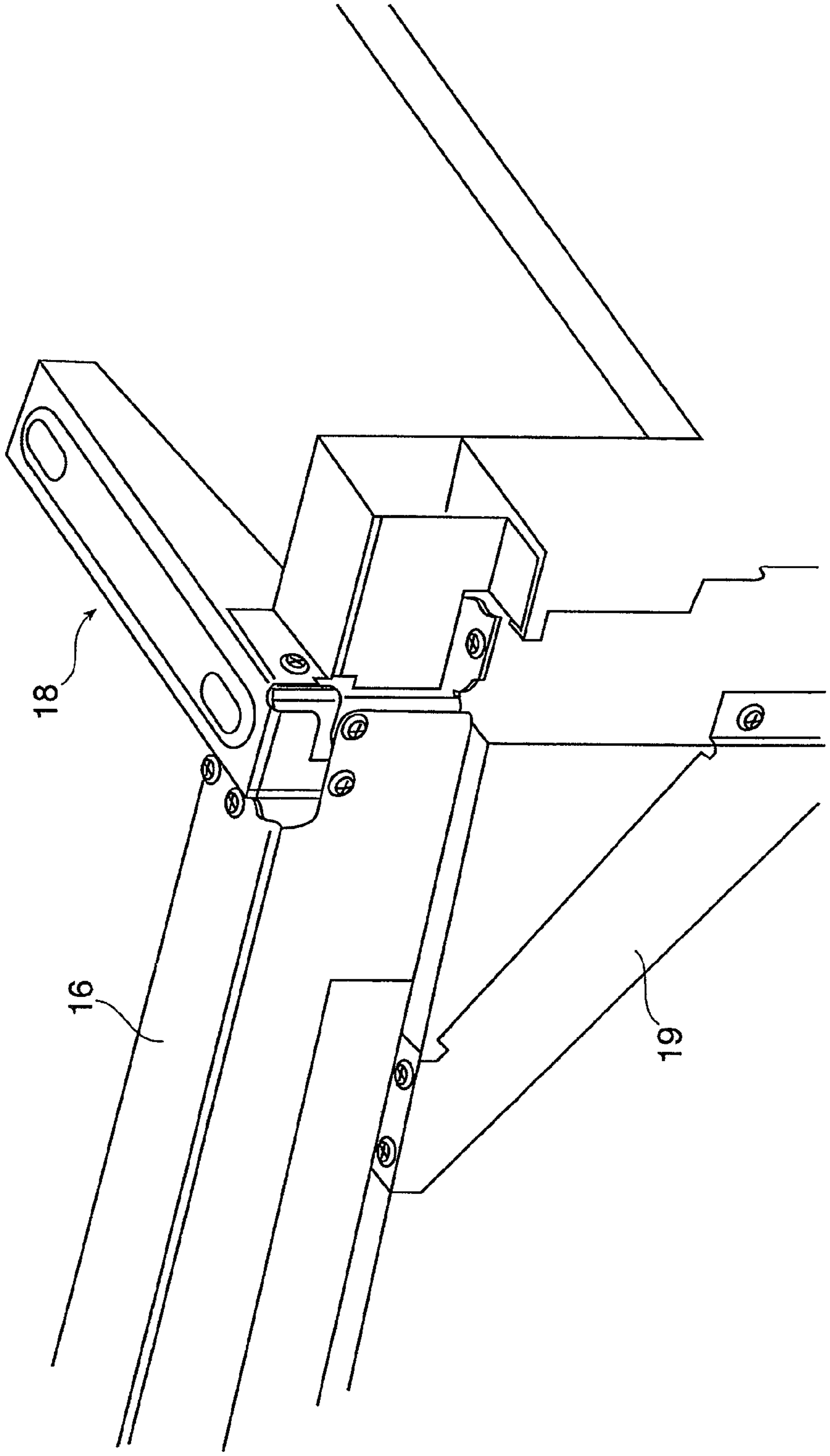
FIG. 10 is a perspective structural view showing the principal portion of the tandem-type color image formation apparatus as the image formation apparatus according to Exemplary Embodiment 1 of the present invention.

In addition, as shown in FIG. 1, the above-described support frame 18 is covered with a cover member 40 as a covering member. The cover member 40 is formed by molding a synthetic resin into a predetermined configuration. The above-described cover member 40 is attached to the under surface 14 of the image reading apparatus 3 so as to cover the surface of the support frame 18. As shown in FIG. 9, one end portion 40*a* (backward-side end portion) of the cover member 40 in the longitudinal direction is fitted into the image formation apparatus main body 2 and, as shown in FIG. 10, claw member 41 of the other end portion 40*b* (forward-side end portion) in the longitudinal direction of the cover member 40, which are provided on the upper surface of the other end portion 40*b* as as to protrude are fitted into concave portions (not shown) provided in the under surface 14 of the image reading apparatus 3, whereby the cover member 40 is fixed. Further, the other end portion 40*b* of the above-described cover member is fixed to the fixing piece 27 provided on the tip end surface of the support frame 18 using screws and the like. By accommodating the support frame in the protrusion shape of the cover member 40 (guide portion) as the above configuration, a height position of the image reading apparatus 3 becomes lower than a height position of the image reading apparatus in a configuration that the support frame 18 is provided on an upper portion of the cover member 40.

Figure 11:
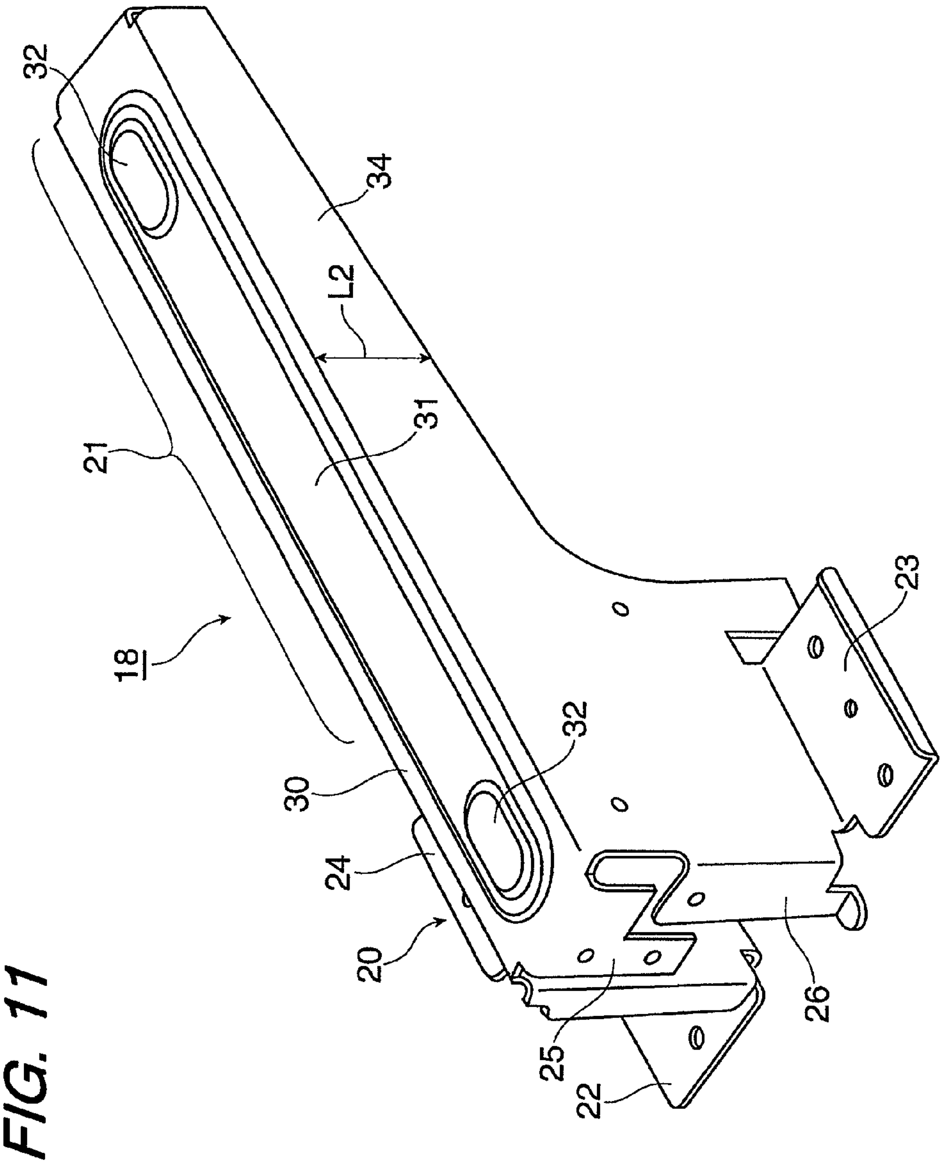
FIG. 11 is a cross-sectional structural view showing the principal portion of the tandem-type color image formation apparatus as the image formation apparatus according to Exemplary Embodiment 1 of the present invention.

As shown in FIGS. 1 and 11, the cross-sectional configuration of the above-described cover member 40 along the discharge direction of the recording medium 13 is formed into a configuration asymmetrical on the upstream and downstream sides in the discharge direction of the recording medium. In the configuration of the under surface of the cover member 40, a first region 42 as the end portion on the upstream side in the discharge direction of the recording medium is formed as a curved surface that is curved to be an upwardly concave configuration that forms a small tilt angle with respect to the under surface (plane surface) 14 of the image reading apparatus 3. Note that the first region 42 may also be formed as a plane surface (oblique surface) formed to form a small tilt angle with respect to the under surface 14 of the image reading apparatus 3.

Further, as shown in FIGS. 1, 10, and 11, in the configuration of the under surface of the above-described cover member 40, a second region 43 positioned on the downstream side in the discharge direction of the recording medium of the first region 42 described above is formed into a downwardly concave configuration along the discharge direction of the recording medium that downwardly directs the leading end portion of the recording medium 13 having passed through the first region 42. As shown in FIG. 1, the second region 43 described above is formed into an arc configuration having a large radius of curvature R.

Furthermore, in the configuration of the under surface of the above-described cover member 40, a third region 44 positioned on the downstream side in the discharge direction of the recording medium of the above-described second region 43 is formed into the upwardly concave configuration along the discharge direction of the recording medium such that the leading end portion of the recording medium having passed through the second region 43 drops downwardly while keeping in contact with the third region 44. As shown in FIG. 1, the third region 44 described above is formed into an arc configuration having a relatively small radius of curvature. A lower end surface 45 of the cover member adjacent to the above-described third region 44 is formed to be flat.

Note that a side surface 46 positioned on the downstream side in the discharge direction of the recording medium of the above-described cover member 40 does not influence the discharge of the recording medium and the like and, as shown in FIG. 2, since the side surface 46 is exposed on the left-side surface of the image formation apparatus main body 2, the side surface 46 is formed into a configuration in consideration of its outer appearance, and is formed into a configuration slightly curved downwardly and inwardly from the under surface of the image reading apparatus 3.

Figure 12:
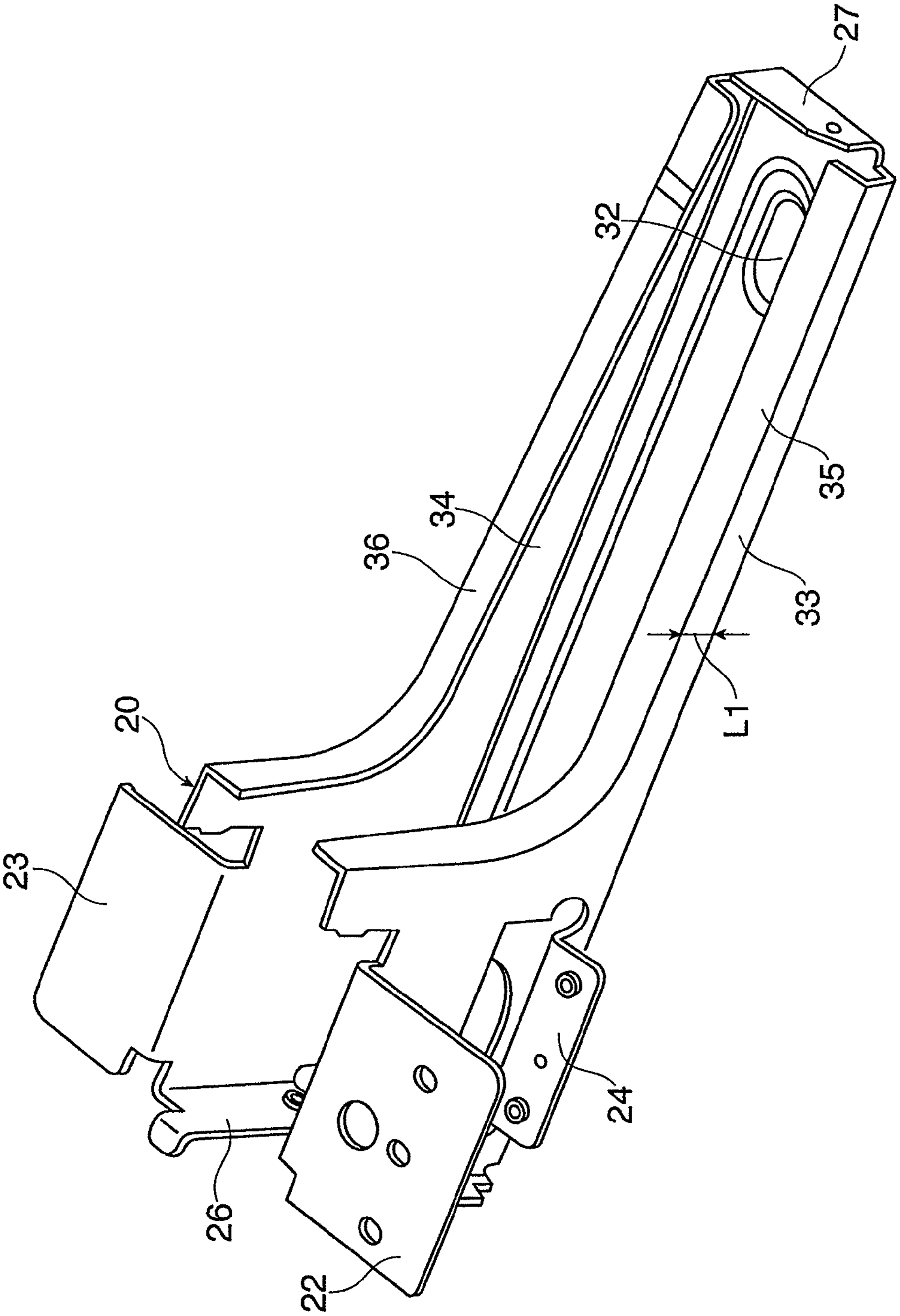
FIG. 12 is a side structural view showing the tandem-type color image formation apparatus as the image formation apparatus according to Exemplary Embodiment 1 of the present invention.

Moreover, as shown in FIGS. 10 and 12, the cross-sectional configuration of the above-described cover member 40 is formed as shown in FIG. 11 in the direction intersecting the discharge direction of the recording medium, and the front surface side thereof is formed such that the height is gradually reduced, and the end portion of the front surface side serves as a low flat portion 47, as shown in FIG. 12.

In the foregoing structure, the color image formation apparatus according to the present exemplary embodiment improves accommodation for the recording medium while suppressing the height of the entire image formation apparatus in the image formation apparatus in which the recording medium is discharged into the discharge space formed between the image reading unit and the image formation unit in the following manner.

Specifically, as shown in FIG. 2, in the color image formation apparatus 1 according to the present exemplary embodiment, the image reading apparatus 3 is disposed above the image formation apparatus main body 2 via the discharge space 4 into which the recording medium 13 is discharged. Accordingly, in the color image formation apparatus 1, when the discharge space 4 positioned between the image formation apparatus main body 2 and the image reading apparatus 3 is enlarged in consideration of discharge of the recording medium 13, i.e., when the height of the discharge space 4 is set to be high, the height of the entire color image formation apparatus 1 is increased. Accordingly, the size of the apparatus is increased and, when the color image formation apparatus 1 is used on a desk in an office, the position of the image reading apparatus 3 is elevated so that operability is lowered.

Consequently, in the color image formation apparatus 1 described above, it is considered that the height of the discharge space 4 positioned between the image formation apparatus main body 2 and the image reading apparatus 3 is set to be as low as possible to achieve a reduction in the size of the image formation apparatus and an improvement in the operability thereof.

In addition, in the color image formation apparatus 1 described above, the support frame 18 for supporting the image reading apparatus 3 is provided on the outside as the end portion on the downstream side in the discharge direction of the recording medium on the under surface 14 of the image reading apparatus 3 instead of the inside of the image reading apparatus 3 to reduce a thickness of the image reading apparatus 3.

Figure 13:
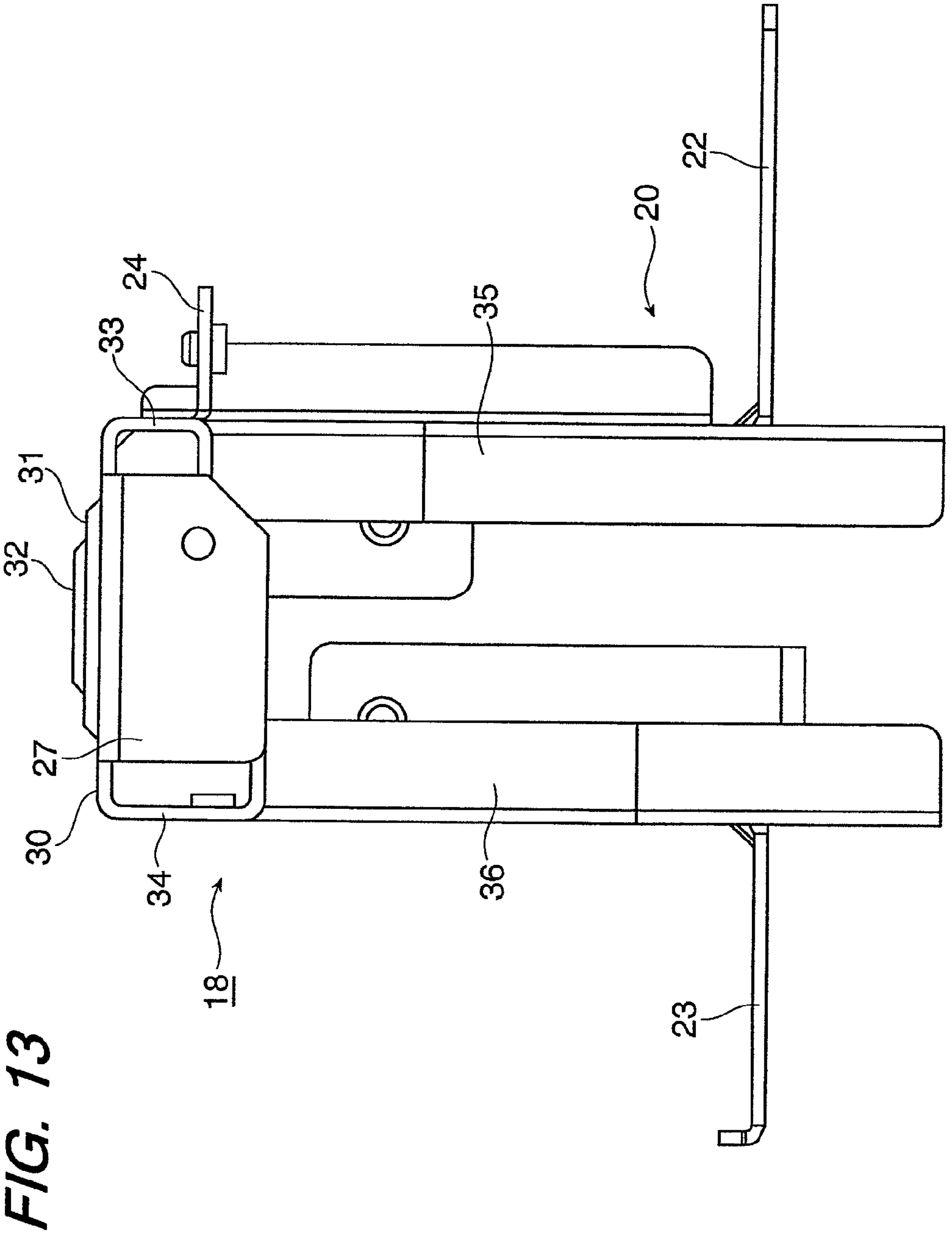
FIG. 13 is a structural view showing an operation of the tandem-type color image formation apparatus as the image formation apparatus according to Exemplary Embodiment 1 of the present invention.

As shown in FIG. 13, the recording medium 13 discharged from the sheet discharge section 10 of the color image formation apparatus 1 passes through the space 4*a* formed between the under surface of the image reading apparatus 3 and the lower end surface f the support frame 18, and is discharged on the sheet discharge tray 12 in the recording medium discharge space 4. The recording medium 13 having a long length along the discharge direction such as the recording medium of an A4 size or a legal size larger than the A4 size moves along the under surface 14 of the image reading apparatus 3, and then contacts the cover member 40 covering the support frame 18.

However, in the color image formation apparatus 1 described above, when the height of the discharge space 4 positioned between the image formation apparatus main body 2 and the image reading apparatus 3 is set to be low, and space 4*a* defined by the under surface of the image reading apparatus 3 and the lower end portion of the support frame 18 is used for discharging the recording medium 13, as shown in FIG. 1 and the like, since the support frame 18 for supporting the image reading apparatus 3 and the cover member 40 for covering the support frame 18 are disposed in the discharge space 4, the recording medium 13 to be discharged into the discharge space 4 goes into the cover member 40 for covering the support frame 18 so that a damage such as bending of the leading end portion of the recording medium 13 is considered to occur.

After the image forming apparatus 1 records an image on the recording medium, the recording medium is discharged to the discharge space 4 through a recording medium discharge port disposed on an upper portion of a side face opposed to the space 4. When the recording medium is discharged from the recording medium discharge port, conveying force is applied to the recording medium by the discharge roll 11 contacting to the recording medium while the discharging roll 11 rotates. A contact portion on the recording medium with the discharging roll changes during discharging of the recording medium. At the contact portion, the recording medium is curved to prevent the recording medium from free fall after discharging the leading end portion of the recording medium. For example, the curved shape of the recording medium is obtained by changing a diameter of a part of the discharge roll opposed to the other discharge roll 11 from a diameter of the part of discharge roll 11 in a state that a plurality of the discharge rolls 11 are disposed on one axis with a given space between each rolls in axial direction. Specifically, the recording medium passing through the discharge roll is bended upwardly and downwardly in a thickness direction of the recording medium. The bended shape may be U-shape or wave shape. Alternatively, a member to bend the recording medium around the recording medium discharge port may be disposed. As described above, the rigidity of the recording medium in a discharge state is increased as compared with the case where the recording medium 13 in a plane configuration is discharged and it is possible to prevent the leading end portion of the recording medium from free fall. In consequence, the leading end portion does not drop down in the middle of discharging of the recording medium and the recording medium comes to far from the recording medium discharge port on the discharge tray 12.

However, with regard to the damage such as bending of the recording medium 13 or the like, in particular, when the recording medium 13 is bended in an upwardly concave configuration, the rigidity is increased as compared with the case where the recording medium 13 in a plane configuration is discharged, and an angular portion of the leading end portion of the recording medium 13 is upwardly positioned so that the leading end of the recording medium 13 goes into the cover member 40 covering the support frame 18, and the bending of the leading end portion of the recording medium or the like becomes more likely to occur. Further, also when the recording medium 13 is curled in a downwardly concave configuration, the rigidity is increased as compared with the case where the recording medium 13 in the plane configuration is discharged, and the central portion of the leading end portion of the recording medium 13 is upwardly positioned so that the leading end of the recording medium 13 is brought into contact with the cover member 40 covering the support frame 18, and the bending of the leading end portion of the recording medium or the like becomes more likely to occur.

Consequently, in the present exemplary embodiment, as shown in FIG. 2, the height of the space 4 for the discharge of the recording medium 13 is set to be low, the occurrence of the damage such as the bending of the recording medium 13 or the like is prevented even when the size of the color image formation apparatus 1 is reduced or the like, and the accommodation for the recording medium 13 is thereby improved in the following manner.

Firstly, the recording medium 13 is bended in the upwardly or downwardly concave configuration to prevent the leading end portion of the recording medium 13 from free fall and increase the resilience of the sheet, and the distance to the landing point of the leading end of the recording medium on the upper surface of the sheet discharge tray 12 is thereby increased. The description has been given herein by using the example in which the recording medium 13 is curled in the concave configuration to increase the resilience of the sheet. However, as long as the resilience of the sheet is increased, the configuration of the leading end of the recording medium 13 when viewed from the leading end side may also be a wavy configuration (one implementation of the curve). The bended recording medium 13 is conveyed with keeping the rigidity until the leading end portion of the recording medium goes into the cover member 40. When the leading end portion goes into the cover member 40, the bending of the recording medium is unbended by leading the leading end portion in a direction across the discharge direction of the recording medium. That is, a state of the recording medium is changed from a bended state into a plane state by shifting the leading end portion along a face of the cover member 40. In the above configuration, a tensile force at a leading end portion is reduced and disadvantages are reduced. For example, the disadvantages include unwished bending and pushing out other sheet which is previously discharged. By setting shape of a face of the cover member to be contacted to the leading end portion having a concave shape against the leading end portion, an effect for canceling the bending is improved compared with the effect for canceling the bending in the cover member having a convex shape.

The above described configuration will be explained below based on more specific exemplary embodiment. In the configuration of the under surface of the above-described cover member 40, as shown in FIGS. 10 and 11, the first region 42 is provided on the end portion on the upstream side in the discharge direction of the recording medium, and the first region 42 is formed to form a small tilt angle with respect to the under surface 14 of the image reading apparatus 3 so that the leading end portion or both angular portions of the leading end portion of the recording medium 13 having moved along the under surface 14 of the image reading apparatus 3 are lifted by the first region 42 of the cover member 40, and spaced apart from the under surface 14 of the image reading apparatus 3.

Figure 14:
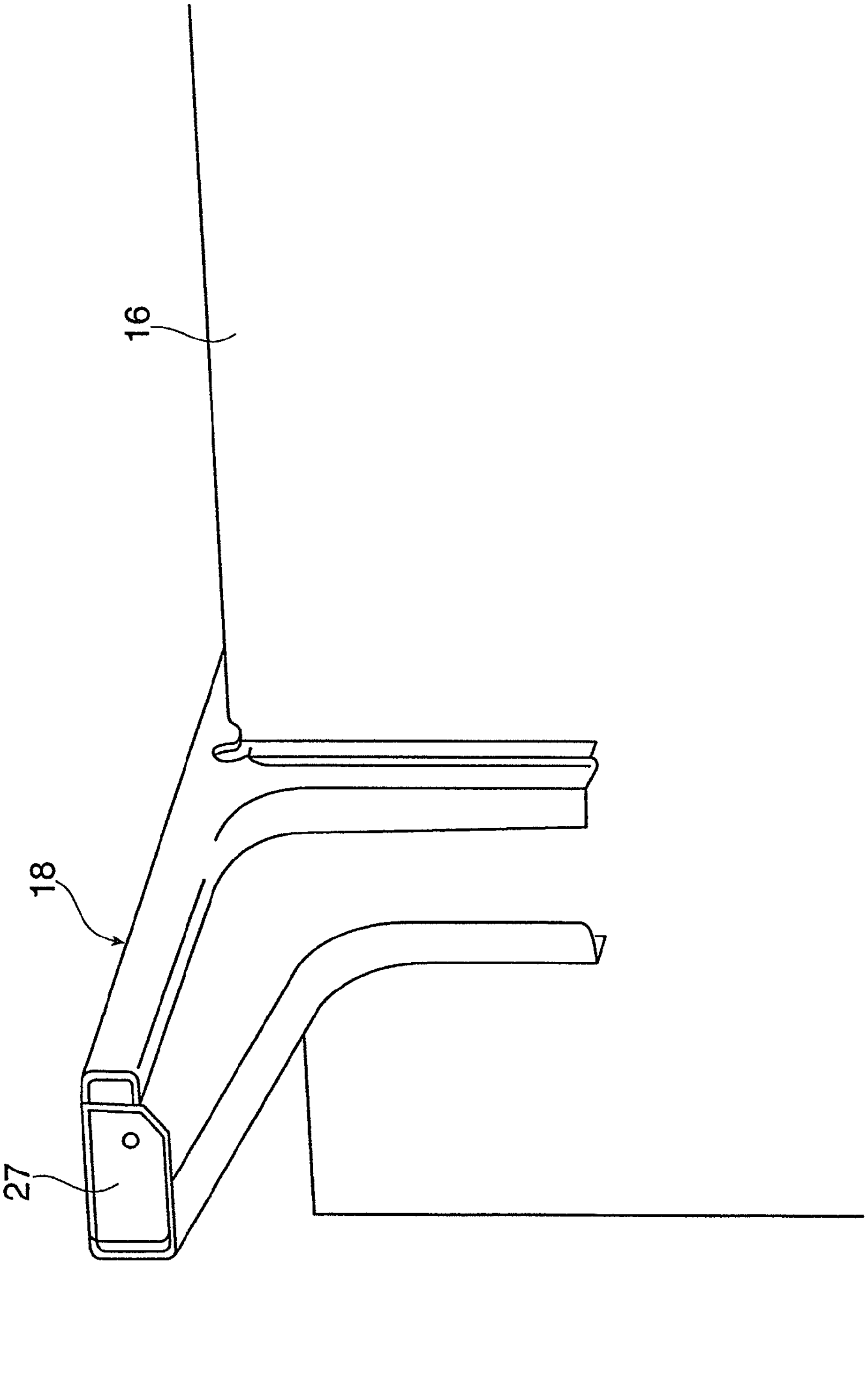
FIG. 14 is a perspective structural view showing the operation of the tandem-type color image formation apparatus as the image formation apparatus according to Exemplary Embodiment 1 of the present invention.
Figure 15:
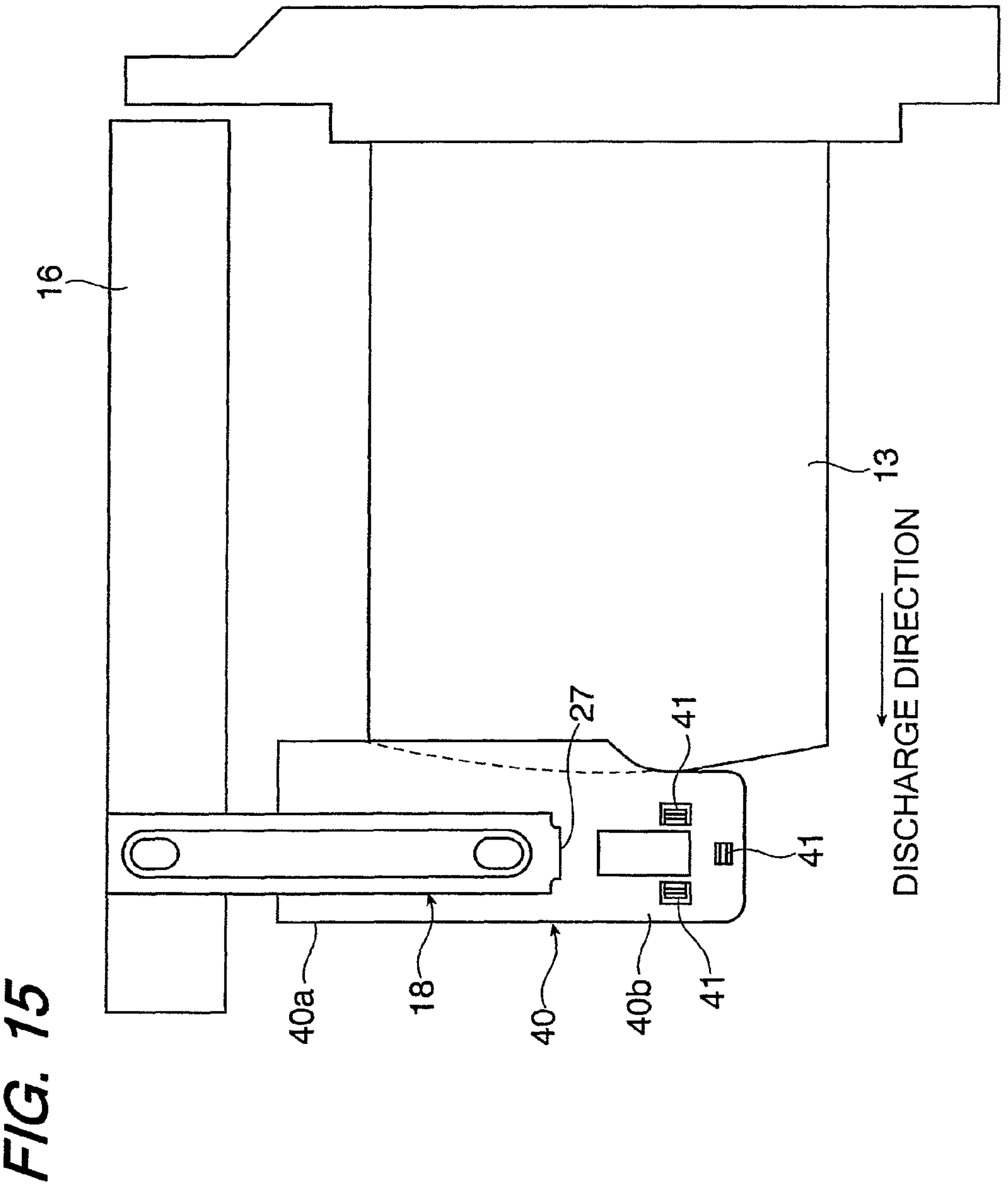
FIG. 15 is a perspective structural view showing the operation of the tandem-type color image formation apparatus as the image formation apparatus according to Exemplary Embodiment 1 of the present invention.
Figure 16:
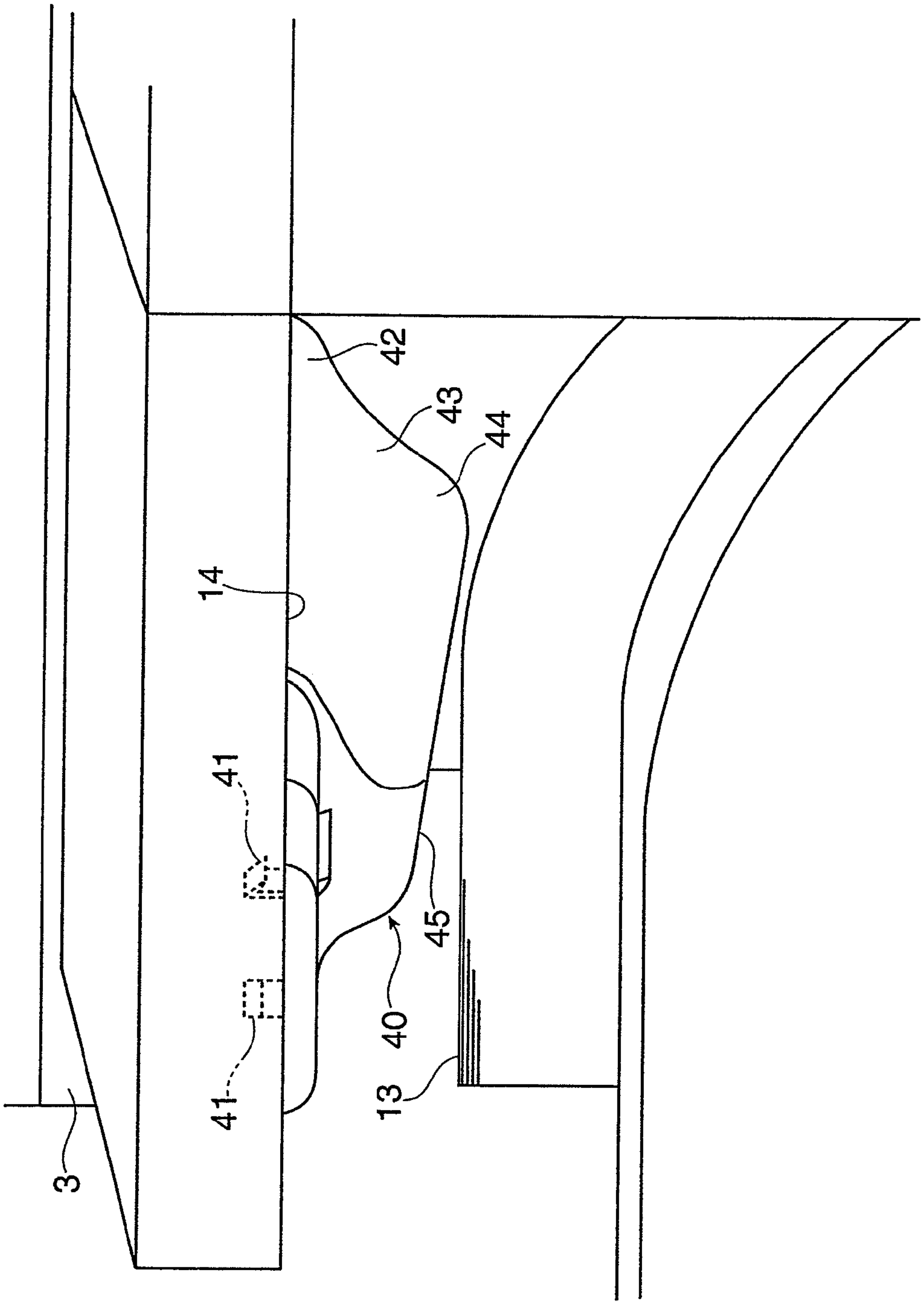
FIG. 16 is a perspective structural view showing the operation of the tandem-type color image formation apparatus as the image formation apparatus according to Exemplary Embodiment 1 of the present invention.

Thereafter, as shown in FIGS. 14 to 16, the leading end portion or the both angular portions of the leading end portion of the recording medium 13 described above pass through the first region 42 of the cover member 40, and then move to the second region 43 provided on the downstream side in the discharge direction of the recording medium of the first region 42. Since the second region 43 of the cover member 40 is comprised of the curved surface formed into the downwardly concave configuration along the discharge direction of the recording medium, the both angular portions of the leading end portion of the recording medium 13 are acted upon by a downward force along the second region 43 of the cover member 40, and the both angular portions of the curled recording medium 13 are directed downward. As a result, the both angular portions of the recording medium 13 are acted upon also by an outwardly spreading force in the direction intersecting the discharge direction of the recording medium.

As a result, the both angular portions of the curled recording medium 13 move downwardly with the curled recording medium 13 being uncurled, and the recording medium 13 becomes almost planar as it passes through the second region 43 of the cover member 40.

Subsequently, after the leading end portion of the recording medium 13 passes through the second region 43 of the cover member 40, the recording medium 13 described above moves to the third region 44 provided on the downstream side in the discharge direction of the recording medium of the second region 43. Since the third region 44 of the cover member 40 is comprised of the curved surface formed into the downwardly convex configuration along the discharge direction of the recording medium, the downward force acting on the leading end portion of the recording medium 13 is gradually released, the leading end portion of the recording medium 13 is brought into the state where it is stretched into a plane configuration along the discharge direction of the recording medium and, besides, slowed down by the flatly stretching force and friction against the surface of the third region 44 as it passes through the third region 44, the velocity component thereof toward the downstream side in the discharge direction of the recording medium becomes nearly zero, and the recording medium 13 drops onto a predetermined position on the sheet discharge tray 12, as shown in FIG. 13.

In the case where the recording medium 13 is curled in the downwardly concave configuration, generally similarly to the case described above, the leading end portion or the central portion of the leading end portion is lifted by the first region 42 of the cover member 40, and spaced apart from the under surface 14 of the image reading apparatus 3.

Accordingly, in the color image formation apparatus 1 described above, even when the recording medium 13 is curled, it is possible to orderly discharge the recording medium 13 onto the sheet discharge tray 12 without causing the damage in which the angular portions of the leading end portion of the recording medium 13 are brought into contact with the cover member 40 and thereby bent, and the like, and improve the accommodation for the recording medium 13.

In the exemplary embodiment described above, although the description has been given of the case where the support frame 18 is covered with the cover member 40, the surface configuration of the support frame 18 may also be formed into the same configuration as that of the cover member described above without providing the cover member.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

EXPLANATIONS OF LETTERS AND NUMERALS

1: color image formation apparatus,
2: image formation apparatus main body,
3: image reading apparatus,
4: recording medium discharge space,
13: recording medium,
18: support frame,
40: cover member,
42: first region,
43: second region.

What is claimed is:

1. An image formation apparatus comprising:

an image formation unit that discharges a recording medium on which an image is formed by an image forming portion into a recording medium discharge space by applying a discharging force to the recording medium and that bends the recording medium in a shape which prevents a leading end portion of the recording medium from falling;

an image reading unit that reads a document image and is disposed above the image formation unit so that the recording medium discharge space is disposed between the image reading unit and the image formation unit; and a guide portion that has a protrusion portion protruding toward the recording medium discharge space from a lower face of the image reading unit and that leads the leading end portion to fall by reducing a bending of the leading end portion when the leading end portion contacts the protrusion portion while the discharging force is applied to the recording medium.

2. The image formation apparatus according to claim 1, wherein height of the protrusion portion becomes larger from a recording medium discharge port to a top portion of the protrusion portion.

3. The image formation apparatus according to claim 2, wherein a part of a face of the protrusion portion to be contacted to the leading end portion is formed in a shape so that the bending of the recording medium is unbended by leading the leading end portion in a direction across a discharge direction of the recording medium.

4. The image formation apparatus according to claim 3, wherein a part of the face of the protrusion portion to be contacted to the leading end portion has concave shape.

5. The image formation apparatus according to claim 1, wherein a part of a side face of the image formation apparatus having an opening so that the recording medium discharged to recording medium discharge space is allowed to be picked up through the opening, the side face being across a direction orthogonal to the discharge direction, and the height of the protrusion portion at a far side of the protrusion portion is larger than the height of the protrusion portion at a near side of the protrusion portion.

6. The image forming apparatus according to claim 1 further comprising a support frame that supports the lower face of the image reading unit and is included in at least a part of inner portion of the protrusion portion.

7. The image formation apparatus according to claim 1, wherein the protrusion portion includes a first guide face which is formed so that an angle of approach of the leading end portion with respect to the first guide face is acute angle when the leading end portion is bended in an upwardly concave configuration with respect to a direction being across the discharge direction, and a second guide face which is formed into a downwardly concave configuration along the discharge direction of the recording medium so as to downwardly lead the leading end portion being passed through the first guide face.

8. The image formation apparatus according to claim 7, wherein the protrusion portion further includes a third guide face which is formed into the upwardly concave configuration along the discharge direction so that the recording medium is dropped onto a recording medium discharge portion provided on an upper side of the image formation unit after the recording medium passes through the second guide face.

9. An image formation apparatus comprising:

an image formation unit that discharges a recording medium on which an image is formed by an image forming portion into a recording medium discharge space by applying a discharging force to the recording medium and that bends the recording medium in a shape which prevents a leading end portion of the recording medium from falling;

an image reading unit that reads a document image and is disposed above the image formation unit so that the recording medium discharge space is disposed between the image reading unit and the image formation unit; and a guide portion that has a protrusion portion protruding toward the recording medium discharge space from a lower face of the image reading unit and that leads the leading end portion to fall by reducing a bending of the leading end portion when the leading end portion contacts the protrusion portion while the discharging force is applied to the recording medium, wherein height of the protrusion portion becomes larger from a recording medium discharge port to a top portion of the protrusion portion.

10. An image formation apparatus comprising:

an image formation unit that discharges a recording medium in a discharging direction to a recording medium discharge space by applying a discharging force to the recording medium, wherein image formation unit bends the recording medium along an axis that extends substantially parallel to the discharging direction, thereby inhibiting a leading end portion of the recording medium from falling;

an image reading unit that is disposed above the image formation unit so that the recording medium discharge space is disposed between the image reading unit and the image formation unit; and a guide portion that protrudes from a lower face of the image reading unit toward the recording medium discharge space, wherein the guide portion reduces the bend of the recording medium along the axis that extends substantially parallel to the discharging direction, thereby causing the leading end portion to fall in response to the leading end portion contacting the guide portion while the discharging force is applied to the recording medium.

* * * * *